United States Patent
Dix et al.

(10) Patent No.: US 11,444,787 B2
(45) Date of Patent: *Sep. 13, 2022

(54) METHOD AND SYSTEM FOR EFFICIENT DISTRIBUTION OF CONFIGURATION DATA UTILIZING PERMISSIONED BLOCKCHAIN TECHNOLOGY

(71) Applicant: MASTERCARD INTERNATIONAL INCORPORATED, Purchase, NY (US)

(72) Inventors: Simon R. Dix, O'Fallon, MO (US); Steven C. Davis, Saint Peters, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 161 days.

This patent is subject to a terminal disclaimer.

(21) Appl. No.: 16/946,859

(22) Filed: Jul. 9, 2020

(65) Prior Publication Data

US 2020/0344073 A1    Oct. 29, 2020

Related U.S. Application Data

(60) Continuation of application No. 16/385,349, filed on Apr. 16, 2019, now Pat. No. 10,721,078, which is a (Continued)

(51) Int. Cl.
*H04L 29/06* (2006.01)
*H04L 9/32* (2006.01)
(Continued)

(52) U.S. Cl.
CPC .......... *H04L 9/3265* (2013.01); *H04L 9/3239* (2013.01); *H04L 9/3247* (2013.01);
(Continued)

(58) Field of Classification Search
CPC ... H04L 9/3265; H04L 9/3239; H04L 9/3247; H04L 41/0803; H04L 2209/38; H04L 2209/56
See application file for complete search history.

(56) References Cited

U.S. PATENT DOCUMENTS

| 9,608,829 B2 | 3/2017 | Spanos et al. |
| 2015/0244690 A1 | 8/2015 | Mossbarger |

(Continued)

FOREIGN PATENT DOCUMENTS

| WO | WO-2006083926 A2 * | 8/2006 | .......... G06F 11/3013 |
| WO | 2016022864 A2 | 2/2016 | |
| WO | WO-2016046820 A1 * | 3/2016 | ....... G06F 17/30949 |

OTHER PUBLICATIONS

Goldfeder, et al., "Securing Bitcoin wallets via a new DSA/ECDSA threshold signature scheme", 2015.
(Continued)

*Primary Examiner* — Shawnchoy Rahman
(74) *Attorney, Agent, or Firm* — Panitch Schwarze Belisario & Nadel LLP

(57) ABSTRACT

A method for propagating configuration data using a blockchain includes: storing a blockchain comprised of a plurality of blocks, each being comprised of a block header having a timestamp and one or more configuration transactions; receiving one or more configuration data items; generating a new configuration transaction for each configuration data item; hashing a most recent block identified based on the timestamp included in the respective block header to generate a previous block hash value; hashing a combination of the new configuration transactions and/or data associated therewith to generate a current block hash value; generating a new block header, the new block header including a current timestamp, the previous block hash value, the current block hash value, and a digital signature; generating a
(Continued)

new block comprised of the new block header and each new configuration transaction; and updating the blockchain by appending the new block.

20 Claims, 8 Drawing Sheets

Related U.S. Application Data division of application No. 15/166,451, filed on May 27, 2016, now Pat. No. 10,305,694.

(51) Int. Cl.
*H04L 41/0803* (2022.01)
*H04L 9/00* (2022.01)

(52) U.S. Cl.
CPC ............ *H04L 41/0803* (2013.01); *H04L 9/50* (2022.05); *H04L 2209/56* (2013.01)

(56) References Cited

U.S. PATENT DOCUMENTS

| 2017/0012943 | A1 | 1/2017 | Kaliski, Jr. et al. |
| 2017/0132625 | A1* | 5/2017 | Kennedy ............ G06F 16/2379 |
| 2017/0134161 | A1* | 5/2017 | Goeringer ............ G06Q 50/188 |
| 2017/0270493 | A1 | 9/2017 | Lugli et al. |
| 2017/0331635 | A1 | 11/2017 | Barinov et al. |
| 2018/0019867 | A1 | 1/2018 | Davis |
| 2018/0101684 | A1 | 4/2018 | Murphy et al. |
| 2018/0183600 | A1 | 6/2018 | Davis |
| 2018/0359096 | A1 | 12/2018 | Ford et al. |

OTHER PUBLICATIONS

Nakamoto, "Bitcoin: A Peer-to-Peer Electronic Cash System", Available at URL:https://bitcoin.org/bitcoin.pdf, retrieved on Jul. 24, 2014, 9 Pages.

International Search Report and Written Opinion issued by the International Search Authority dated Jun. 9, 2017 in corresponding PCT Application No. PCT/US2017/024426 (14 pages).

Tsai, et al., "A system view of financial blockchains", Service-Oriented System Engineering (SOSE), IEEE.

Wood, "A Secure Decentralised Generalised Transaction Ledger Final Draft—Under Review", Available at URL:http://gavwood.com/paper.pdf on Jan. 18, 2016, 29 Pages.

Office Action (First Examination Report) dated Mar. 19, 2020, by the Intellectual Property India in corresponding India Patent Application No. 201817006001 and an English Translation of the Office Action. (6 pages).

* cited by examiner

METHOD AND SYSTEM FOR EFFICIENT DISTRIBUTION OF CONFIGURATION DATA UTILIZING PERMISSIONED BLOCKCHAIN TECHNOLOGY

FIELD

The present disclosure relates to the distribution of configuration data using a blockchain, specifically the propagation of configuration data across a computing network using a blockchain for the updating of configuration rules in computing devices included in the computing network.

BACKGROUND

Computing networks may utilize a number of different topologies. Some topologies, such as the hub and spoke model, are built towards a combination of control and efficiency, while other models, such as mesh networks, are built towards a combination of efficiency and redundancy. In order to update configuration data or push other types of data to a computing device that is several connections away from the source of the data, the data must travel via a number of other computing devices. In large computing networks, regardless of the topology utilized, the number of computing devices that must be used to pass data from the source to an end computing device can be in the double or triple digits.

In many instances, the computing device receiving the data must be able to trust that the data is genuine and has not been tampered with. As a result, the computing device must be able to verify the data itself, as well as the permission and authenticity of every single computing device through which the data was routed from the source. In large computing networks, this may require the verification and authentication of a significant number of computing devices, which may be significantly time consuming and must be performed repeatedly by every destination computing device. In an effort to reduce verification time, some networks are built to have a higher number of direct connections to the source, or to minimize the number of intermediate computing devices. However, this may require significant overhauling to computing networks, which may be impractical or in some cases impossible due to physical and resource limitations, and may also have greater weakness in the event of a failure or attack due to the lack of redundancy and high number of connections to the source or primary intermediate nodes.

Thus, there is a need for a technical solution to provide for more efficient and effective propagation of configuration data to computing devices in a computing network.

SUMMARY

The present disclosure provides a description of systems and methods for propagating and updating configuration data using a blockchain. The use of a blockchain may provide for faster validation of the configuration data, regardless of the number of intermediate computing devices used, which may result in a more efficient distribution of configuration data, particularly in instances where the number of intermediate computing devices is increased to provide for quicker distribution, as well as stronger redundancy for improved computing network performance.

A method for propagating configuration data using a blockchain includes: storing, in a memory of a processing server, a blockchain, wherein the blockchain is comprised of a plurality of blocks, each block being comprised of a block header and one or more configuration transactions, the block header comprising at least a timestamp; receiving, by a receiving device of the processing server, a data file that includes one or more configuration data items; generating, by a generation module of the processing server, a new configuration transaction for each configuration data item included in the received data file that includes at least the respective configuration data; hashing, by a hashing module of the processing server, a most recent block to generate a previous block hash value, wherein the most recent block is identified based on the timestamp included in the respective block header; hashing, by the hashing module of the processing server, a combination of the generated new configuration transactions and/or data associated with the generated new configuration transactions to generate a current block hash value; generating, by the generation module of the processing server, a new block header, wherein the new block header includes at least a current timestamp, the previous block hash value, the current block hash value, and a digital signature; generating, by the generation module of the processing server, a new block, wherein the new block is comprised of at least the generated new block header and each generated new configuration transaction; updating, by the generation module of the processing server, the blockchain by appending the generated new block to the blockchain; and electronically transmitting, by a transmitting device of the processing server, the updated blockchain.

A method for updating configuration data using a blockchain includes: storing, in a memory of a computing device, a plurality of configuration rules; receiving, by a receiving device of the computing device, a blockchain, wherein the blockchain is comprised of a plurality of blocks including at least one update block, and wherein the update block is comprised of at least a block header and one or more configuration transactions, the block header being comprised of at least a timestamp, block hash value, and a digital signature and each of the one or more configuration transactions being comprised of at least configuration data; verifying, by a verification module of the computing device, the digital signature included in the block header included in the update block included in the plurality of blocks comprising the received blockchain; and executing, by a querying module of the computing device, a query on the memory to update the plurality of configuration rules based on the configuration data included in each of the one or more configuration transactions included in the update block included in the plurality of blocks comprising the received blockchain, wherein updating the plurality of configuration rules includes at least one of: (i) adding a new configuration rules to the plurality of configuration rules, (ii) removing a configuration rule from the plurality of configuration rules, and (iii) modifying a configuration rule of the plurality of configuration rules.

A system for propagating configuration data using a blockchain includes: a transmitting device of a processing server; a memory of the processing server configured to store a blockchain, wherein the blockchain is comprised of a plurality of blocks, each block being comprised of a block header and one or more configuration transactions, the block header comprising at least a timestamp; a receiving device of the processing server configured to receive a data file that includes one or more configuration data items; a generation module of the processing server configured to generate a new configuration transaction for each configuration data item included in the received data file that includes at least the respective configuration data; and a hashing module of the processing server configured to hash a most recent block to generate a previous block hash value, wherein the most recent block is identified based on the timestamp included in the respective block header, and a combination of the generated new configuration transactions and/or data associated with the generated new configuration transactions to generate a current block hash value. The generation module of the processing server is further configured to: generate a new block header, wherein the new block header includes at least a current timestamp, the previous block hash value, the current block hash value, and a digital signature; generate a new block, wherein the new block is comprised of at least the generated new block header and each generated new configuration transaction; and update the blockchain by appending the generated new block to the blockchain. The transmitting device of the processing server is configured to electronically transmit the updated blockchain.

A system for updating configuration data using a blockchain includes: a memory of a computing device configured to store a plurality of configuration rules; a receiving device of the computing device configured to receive a blockchain, wherein the blockchain is comprised of a plurality of blocks including at least one update block, and wherein the update block is comprised of at least a block header and one or more configuration transactions, the block header being comprised of at least a timestamp, block hash value, and a digital signature and each of the one or more configuration transactions being comprised of at least configuration data; a verification module of the computing device configured to verify the digital signature included in the block header included in the update block included in the plurality of blocks comprising the received blockchain; and a querying module of the computing device configured to execute a query on the memory to update the plurality of configuration rules based on the configuration data included in each of the one or more configuration transactions included in the update block included in the plurality of blocks comprising the received blockchain, wherein updating the plurality of configuration rules includes at least one of: (i) adding a new configuration rules to the plurality of configuration rules, (ii) removing a configuration rule from the plurality of configuration rules, and (iii) modifying a configuration rule of the plurality of configuration rules.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Propagation and Updating of Configuration Data Using a Blockchain

Figure 1:
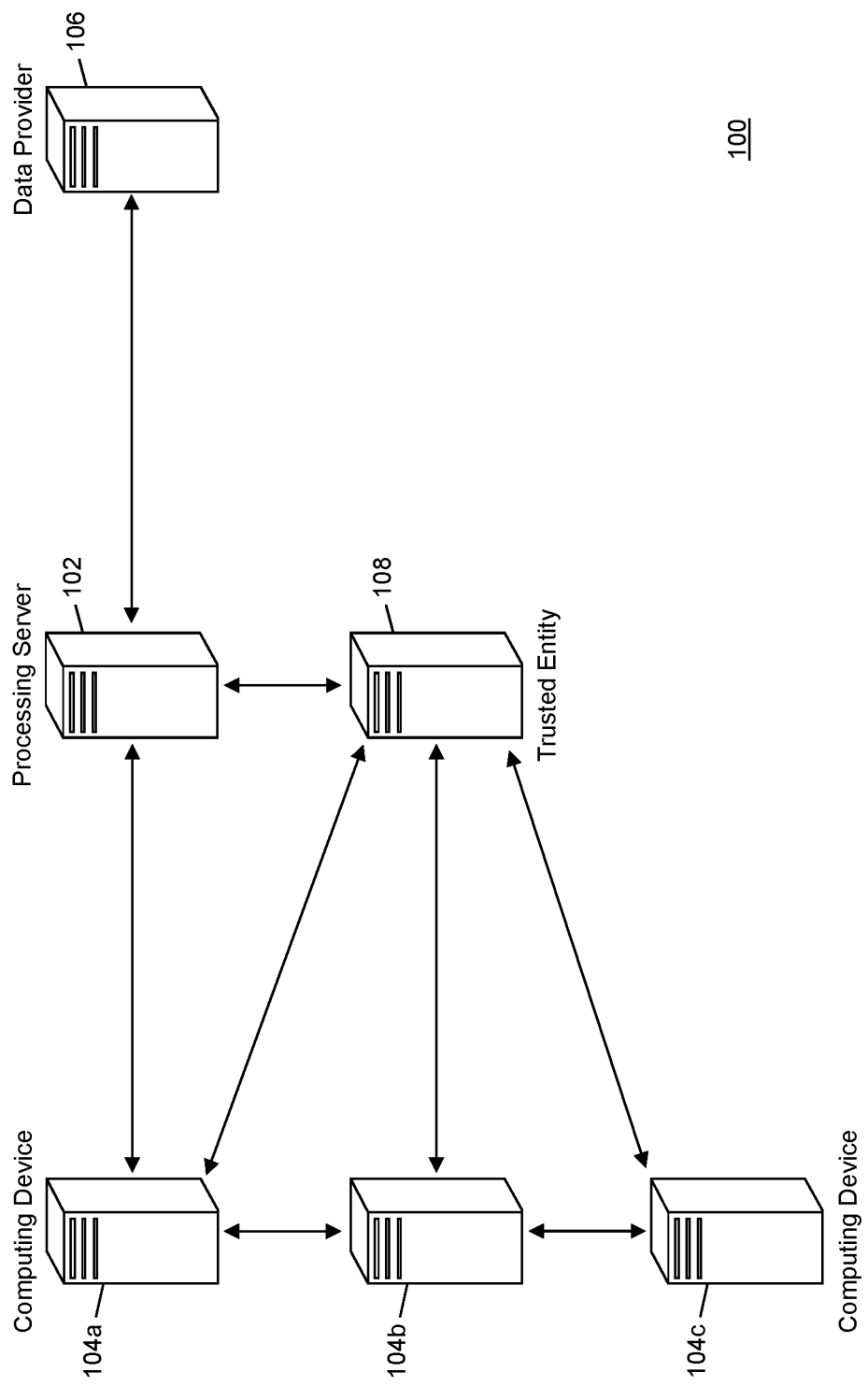
FIG. 1 is a block diagram illustrating a high level system architecture for the propagation and updating of configuration data using a blockchain in accordance with exemplary embodiments.

FIG. 1 illustrates a system 100 for the propagation of configuration data throughout a computing network using a blockchain and the updating of configuration data in computing devices of the computing network based thereon.

The system 100 may include a processing server 102. The processing server 102, discussed in more detail below, may be configured to generate and add blocks to a blockchain that are comprised of configuration transactions used to propagate configuration data to a plurality of computing devices 104 that comprise a computing network, illustrated in FIG. 1 as computing devices 104a, 104b, and 104c. The computing devices 104 may be configured to communicate using any suitable type of network topology, such as a hub and spoke network, mesh network, bus network, point to point network, ring network, tree network, a combination thereof, etc. At least one computing device 104, illustrated in FIG. 1 as computing device 104a, may be configured to electronically communicate with the processing server 102 using any suitable communication network and method, such as a local area network, wide area network, radio frequency network, the Internet, etc. In some embodiments, the processing server 102 may be a computing device 104 in the computing network.

The processing server 102 may receive configuration data from a data provider 106. The data provider 106 may be any type of entity that may need to provide configuration data to a plurality of computing devices 104 in a computer network. For example, the data provider 106 may be a payment network that provides configuration data used in the routing and processing of payment transactions, as discussed below, an entity in a blockchain network that provides configuration data used in the confirmation and posting of blockchain transactions, a research agency that provides configuration data used in the formatting and presentation of research data, etc. The data provider 106 may electronically communicate with the processing server 102 using any suitable communication network and method. The data provider 106 may electronically transmit a data signal to the processing server 102 using the communication network that is superimposed or otherwise encoded with the configuration data. As discussed in more detail below, the configuration data may include indications of prior configuration rules, such as for the deletion or modification to respective prior configuration rules, or may include configuration data for use in the generation of new configuration rules.

The processing server 102 may receive the configuration data from the data provider 106 and may generate, for each configuration data item received from the data provider, a new configuration transaction. Each configuration transaction may be a blockchain transaction that includes at least the respective configuration data, and may also include any additional data associated therewith, such as a hash value of a prior configuration transaction, discussed in more detail below, used for the deletion or modification thereof. Once a configuration transaction is generated for each configuration transaction, the processing server 102 may generate a new block for the blockchain that includes each new configuration transaction. Each block may include at least a block header and the plurality of configuration transactions being added to the blockchain in the respective block. The block header may include at least a timestamp, a hash value of a previous block in the blockchain, one or more hash values associated with the configuration transactions included in the block, and a digital signature.

The timestamp may be a registration of the time at which the block is created. The timestamp may be formatted using any suitable representation of time, such as a number of seconds since the beginning of the UNIX epoch, or other type of representation that will be apparent to persons having skill in the relevant art. The hash value of a previous block may be a hash value generated by the processing server 102 via the application of one or more hashing algorithms to a prior block included in the blockchain. In some instances, the prior block used may be the most recent block previously added to the blockchain, which may be identified via the timestamp included in the respective block's block header. The hash value of the prior block may be included in the block header of the block being newly added for organization of the blocks included in the blockchain, which may be subsequently used in the organization of the blockchain transactions included therein.

The one or more hash values associated with the configuration transactions included in the block may be used in the verification of the configuration transactions stored in the respective block. In one embodiment, the hash values may include a hash of each configuration transaction, generated by the processing server 102 via the application of one or more hashing algorithms to the respective configuration transaction. In some embodiments, the processing server 102 may generate a hash value for each configuration transaction, and may then generate a combined hash value, referred to by persons having skill in the relevant art as a "merkle root" via application of one or more hashing algorithms to the hash values generated for each configuration transaction. The combined hash value may be included in the block header as a representation of the configuration transactions included in the respective block.

The digital signature may resolve to a trusted entity 108 associated with the computing network and/or the blockchain that may be used to verify the authenticity of the processing server 102 and the authority of the processing server 102 to add the newly generated block to the blockchain. The digital signature may be any suitable type of digital certificate or other signature that may be used in the verification of data or an entity associated therewith that will be apparent to persons having skill in the relevant art, such as a public key cryptography standard certificate. In some instances, the processing server 102 may be configured to apply for and receive a new digital signature from the trusted entity 108 using a suitable communication network and method for each new block being added to the blockchain.

Once the new block is generated, including the block header and configuration transactions, the processing server 102 may add the newly generated block to the blockchain by appending it thereto. The processing server 102 may then electronically transmit a data signal superimposed or otherwise encoded with the blockchain to the computing device 104a. The computing device 104a may then distribute the blockchain to one or more other computing devices 104 in the computing network using any suitable distribution method. The computing devices 104 in the computing network may then continue to propagate the updated blockchain across the computing network until it has been received by each of the computing devices 104. In embodiments where the processing server 102 may be a computing device 104, the processing server 102 may initiate the propagation in the computing network.

Each computing device 104 may be configured to validate the new block added to the blockchain and update one or more configuration rules included therein using the configuration data comprising the configuration transaction(s) included in the newly added block. Each computing device 104 may identify the newly added block (e.g., via the timestamp included in the respective block header) and may request validation of the digital signature included therein by the trusted entity 108. The computing device 104 may, for example, electronically transmit a data signal superimposed or otherwise encoded with the digital signature to the trusted entity 108, which may return a data signal superimposed or otherwise encoded with a result of the validation, such as a positive or negative result.

Upon receipt of a positive result, the computing device 104 may be configured to update configuration rules stored therein based on the configuration transactions included in the newly added block. In some instances, the computing device 104 may first validate the configuration transactions included in the newly added block via the hash value included in the block header, such as by hashing each of the configuration transactions (e.g., and, if applicable, hashing the generated hash values) and by comparing the generated hash value(s) to the hash value or values included in the block header. In instances where the validation of the digital signature by the trusted entity 108 or validation of the configuration transactions by the computing device 104 may be unsuccessful, the computing device 104 may refrain from updating the configuration data.

If the validation process is successful, the computing device 104 may be configured to update the configuration data stored therein based on each configuration transaction. Each configuration transaction may include at least a value field and configuration data. In some instances, one or more configuration transactions may also include a hash value. The value field may indicate an operation to be performed by the computing device 104 with respect to the associated configuration data. For example, the value field may indicate if a configuration rule is to be added, with the rule being based on the associated configuration data. In another example, the value field may indicate that an existing configuration rule is to be deleted or modified. In such instances, the existing configuration rule may be identified via the hash value included in the respective configuration transaction. The computing device 104 may hash prior configuration transactions to generate hash values associated therewith. The computing device 104 may compare the hash value included in the new configuration transaction with the hash values for the prior transactions, and, if a match is identified, may delete or modify the corresponding configuration rule accordingly. Modification to the configuration rule may include the replacement or modification of the rule as indicated in the associated configuration data. In some cases, the configuration data for a modification may be a hash value of another prior configuration transaction, such that the associated configuration rule is to be reverted back to the other prior configuration transaction indicated via the hash value.

The use of a blockchain to update configuration data in the computing devices 104 of the computing network may provide for increased efficiency and effectiveness of the propagation of configuration data throughout the computing network. Because the blockchain is independently verifiable via the trusted entity 108, the computing devices 104 may each distribute the blockchain throughout the computing network, such as via peer-to-peer connections, without requiring that a computing device 104 verify the authenticity of the computing device 104 transmitting the blockchain. In addition, the use of hash values in the blockchain itself may enable the computing device 104 to not only validate the authenticity of the block including the new configuration transactions, but to also validate the configuration transactions included therein.

In addition, the use of the blockchain, which maintains a ledger of all prior configuration transactions, may enable modifications and deletions of configuration data to be propagated more easily than in traditional systems, where prior configuration rules may be identified using directly associated identification values. For instance, in a traditional system the processing server 102 may generate and associated an identification value, such as an identification number, to each configuration rule. Each computing device 104 must utilize the assigned identification values in the storage and maintenance of the configuration rules, for use in the modification and deletion of the respective rules in the future. By using the blockchain, the computing device 104 can generate hash values for prior configuration transactions at any time for use in identification of configuration rules, which may enable rules to be modified or deleted without the assignment and maintenance of identification values across the entire computing network and processing server 102.

In some embodiments, configuration transactions may also include lock and/or release times. A lock time may be a time at which the associated configuration rule is to take effect. A release time may be a time at which the associated configuration rule is to stop having an effect. Each computing device 104 may be configured to incorporate the lock time and/or release time included in a configuration transaction with the associated configuration rule and to utilize the configuration rule accordingly. In some instances, lock times and release times may be represented via a timestamp, such as using the same representation as the timestamp included in the block header. For example, a configuration transaction may include a value field indicating deletion of a prior configuration transaction, a hash value of the prior configuration transaction, and a release time at which the deletion is to be processed by the computing device.

In some embodiments, the computing network may be a payment network. A payment network may be a computing system or network used for the transfer of money via the use of cash-substitutes for thousands, millions, and even billions of transactions during a given period. Payment networks may use a variety of different protocols and procedures in order to process the transfer of money for various types of transactions. The payment network may be associated with payment rails, which may be infrastructure associated with the payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. The payment rails may be comprised of the computing devices 104, which may be specially configured for the routing of transaction messages, which may be specially formatted data messages that are electronically transmitted via the payment rails. The transaction messages may be specially formatted pursuant to one or more standards governing the exchange of financial transaction messages, such as the International Organization for Standardization's ISO 8583 standard.

In such embodiments, the processing server 102 may be part of the payment network and may be configured to propagate new configuration data to the computing devices 104 via the blockchain. The configuration data may include data used by the computing devices 104 in the routing of transaction messages as part of the processing of payment transactions by the payment network. For example, the configuration data may include routing data used in the routing of transaction messages to appropriate financial institutions as part of the authorization, clearing, and/or settlement of payment transactions. The use of the blockchain to propagate configuration data may be beneficial in such payment networks, where configuration data may be modified one or more times daily and must be propagated to millions of computing devices across the world.

Processing Server

Figure 2:
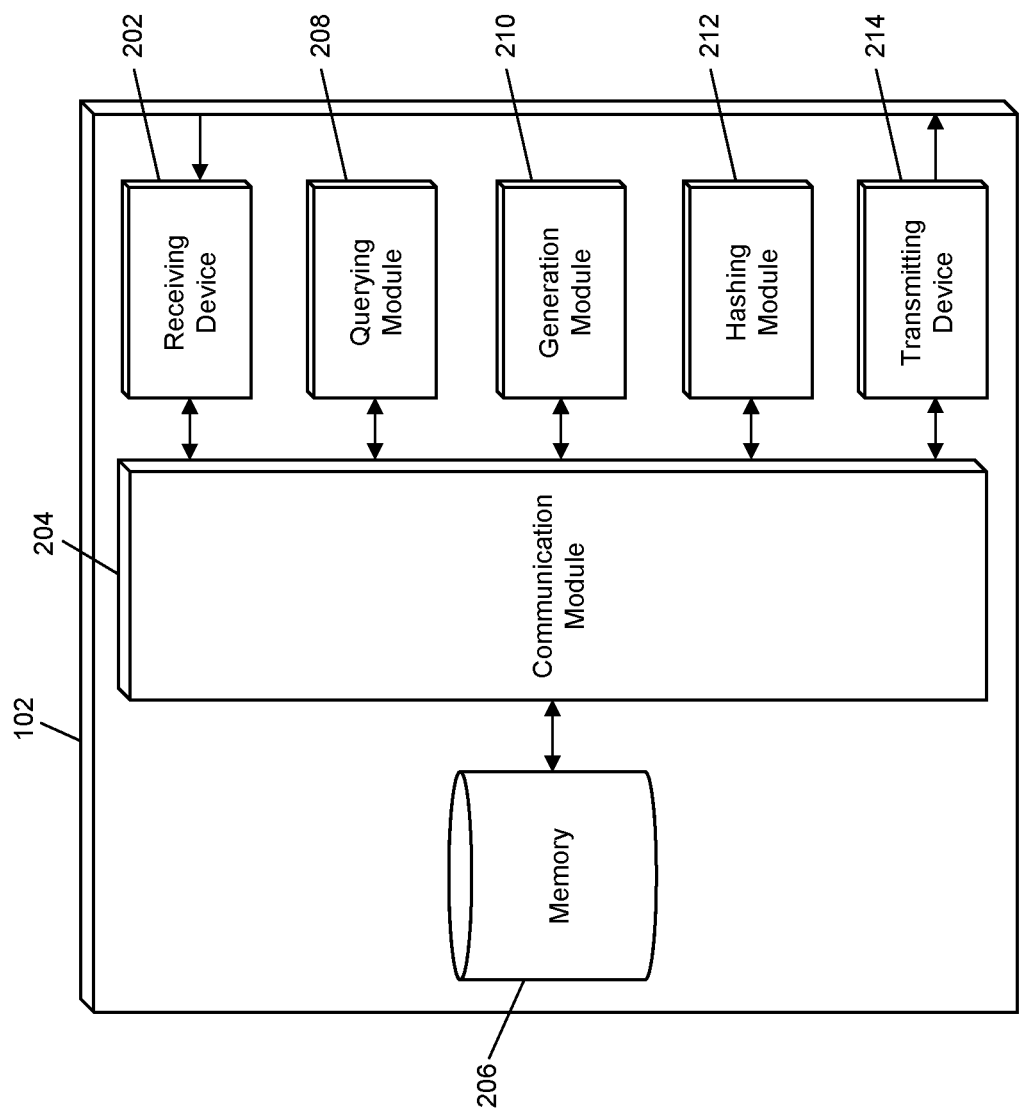
FIG. 2 is a block diagram illustrating the processing server of FIG. 1 for the propagation of configuration data using a blockchain in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 800 illustrated in FIG. 8 and discussed in more detail below may be a suitable configuration of the processing server 102.

The processing server 102 may include a receiving device 202. The receiving device 202 may be configured to receive data over one or more networks and communication channels via one or more network protocols and communication methods. In some instances, the receiving device 202 may be configured to receive data from computing devices 104, data providers 106, trusted entities 108, etc. In some embodiments, the receiving device 202 may be comprised of multiple devices, such as different receiving devices for receiving data over different networks, such as a first receiving device for receiving data over the Internet and a second receiving device for receiving data via payment rails. The receiving device 202 may receive data signals that are electronically transmitted, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by data providers 106, which may be superimposed or otherwise encoded with configuration data items. Each configuration data items may include a value field, configuration data, and may, in some instances, include hash values, lock times, and/or release times. The receiving device 202 may also be configured to receive data signals electronically transmitted by trusted entities 108, which may be superimposed or otherwise encoded with digital signatures and other digital certificates for use in providing verification of blocks added to the blockchain. The receiving device 202 may also receive data signals electronically transmitted by computing devices 104 superimposed or otherwise encoded with requests for an updated blockchain.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 208, generation module 210, hashing module 212, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may also include a memory 206. The memory 206 may be configured to store data for use by the processing server 102 in performing the functions discussed herein. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein.

The memory 206 may be configured to store a blockchain. The blockchain may be comprised of a plurality of blocks, each block having a block header and one or more configuration transactions. A block header may include at least a timestamp, a hash value of a prior block, a hash value or values associated with the configuration transactions included in the respective block, and a digital signature. Each of the configuration transactions may include at least a value field and configuration data, and may, in some instances, also include a hash value associated with a prior configuration transaction, a lock time, and/or a release time.

The processing server 102 may include a querying module 208. The querying module 208 may be configured to execute queries on databases to identify information. The querying module 208 may receive one or more data values or query strings, and may execute a query string based thereon on an indicated database, such as the memory 206, to identify information stored therein. The querying module 208 may then output the identified information to an appropriate engine or module of the processing server 102 as necessary. The querying module 208 may, for example, execute a query on the memory 206 to identify the most recent block in the blockchain for use in generating a new block, where the most recent block is identified based on the timestamp included in the respective block header.

The processing server 102 may also include a generation module 210. The generation module 210 may be configured to generate configuration transactions, block headers, and new transaction blocks for adding to a blockchain. The generation module 210 may receive an instruction and data associated therewith, may generate data pursuant to the instruction, and may output the generated data for use by another module or engine of the processing server 102. For example, the generation module 210 may generate a configuration transaction that includes configuration data as included in a configuration data item received from the data provider 106 (e.g., via the receiving device 202). The generation module 210 may also generate a block header for a new block to be added to the blockchain, which may include the a prior block hash value, a hash value or values for the configuration transactions included in the respective block, a digital signature (e.g., received via the receiving device 202), and a timestamp, which may be generated by the generation module 210 using suitable methods. The generation module 210 may also generate blocks for adding to the blockchain, which may include a block header and corresponding configuration transactions generated by the generation module 210.

The processing server 102 may also include a hashing module 212. The hashing module 212 may be configured to generate hash values. The hashing module 212 may receive data to be hashed, may generate a hash value via the application of one or more hashing algorithms to the data, and may output the hash value to another module or engine of the processing server 102. In some instances, the hashing module 212 may receive an instruction indicating the hashing algorithm or algorithms to use to generate the hash value. In other instances, the hashing module 212 may identify (e.g., via the issuing of an instruction to the querying module 208) a hashing algorithm or algorithms to use to generate a hash value using provided data. The hashing module 212 may be configured to generate hash values of blocks in the blockchain, hash values of configuration transactions, and hash values of a plurality of hash values, such as generating a merkle root using hash values for a plurality of configuration transactions.

The processing server 102 may also include a transmitting device 214. The transmitting device 214 may be configured to transmit data over one or more networks and communication channels via one or more network protocols and communication methods. In some instances, the transmitting device 214 may be configured to transmit data to computing devices 104, data providers 106, trusted entities 108, etc. In some embodiments, the transmitting device 214 may be comprised of multiple devices, such as different transmitting devices for transmitting data over different networks, such as a first transmitting device for transmitting data over the Internet and a second transmitting device for transmitting data via payment rails. The transmitting device 214 may electronically transmit data signals that have data superimposed or otherwise encoded thereon that may be parsed by a receiving computing device. In some instances, the transmitting device 214 may include one or more modules for superimposing, encoding, or otherwise formatting data into data signals suitable for transmission.

The transmitting device 214 may be configured to electronically transmit data signals to computing devices 104 that are superimposed or otherwise encoded with an updated blockchain. The transmitting device 214 may also be configured to electronically transmit data signals to the trusted entity 108 that are superimposed or otherwise encoded with a request for a digital signature or other type of certificate. In some instances, the request may include authentication data associated with the processing server 102 or other data that may be used in the generation and/or issuance of a digital signature to the processing server 102. In some instances, the processing server 102 may also be configured to electronically transmit data signals to the data provider 106 that are superimposed or otherwise encoded with data requests, such as a request for new configuration data to propagate to the computing devices 104.

Computing Device

Figure 3:
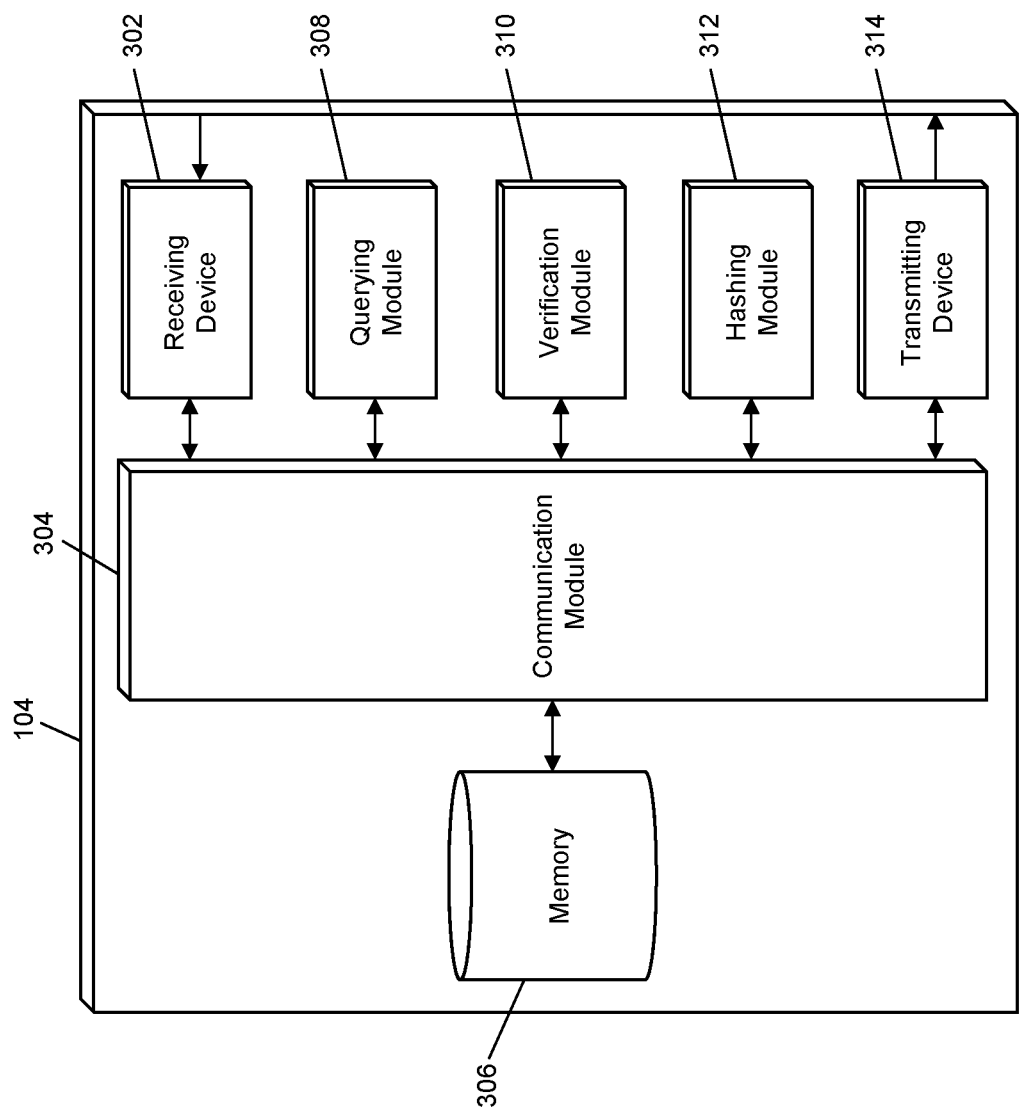
FIG. 3 is a block diagram illustrating the computing device of FIG. 1 for the updating of configuration data using a blockchain in accordance with exemplary embodiments.

FIG. 3 illustrates an embodiment of the computing device 104 of the system 100. It will be apparent to persons having skill in the relevant art that the embodiment of the computing device 104 illustrated in FIG. 3 is provided as illustration only and may not be exhaustive to all possible configurations of the computing device 104 suitable for performing the functions as discussed herein. For example, the computer system 800 illustrated in FIG. 8 and discussed in more detail below may be a suitable configuration of the computing device 104.

The computing device 104 may include a receiving device 302. The receiving device 302 may be configured to receive data over one or more networks and communication channels via one or more network protocols and communication methods. In some instances, the receiving device 302 may be configured to receive data from processing servers 102, other computing devices 104, trusted entities 108, etc. In some embodiments, the receiving device 302 may be comprised of multiple devices, such as different receiving devices for receiving data over different networks, such as a first receiving device for receiving data over the Internet and a second receiving device for receiving data via payment rails. The receiving device 302 may receive data signals that are electronically transmitted, where data may be superimposed or otherwise encoded on the data signal and decoded, parsed, read, or otherwise obtained via receipt of the data signal by the receiving device 302. In some instances, the receiving device 302 may include a parsing module for parsing the received data signal to obtain the data superimposed thereon. For example, the receiving device 302 may include a parser program configured to receive and transform the received data signal into usable input for the functions performed by the processing device to carry out the methods and systems described herein.

The receiving device 302 may be configured to receive data signals electronically transmitted by other computing devices 104 or the processing server 102 that are superimposed or otherwise encoded with an updated blockchain. The updated blockchain may include a plurality of blocks, including a newly added block, with each block including a block header and a plurality of configuration transactions. The receiving device 302 may also be configured to receive data signals electronically transmitted by the trusted entity 108, which may be superimposed or otherwise encoded with a validation result based on validation of a digital signature provided by the computing device 104 from the block header of a newly added block in the updated blockchain.

The computing device 104 may also include a communication module 304. The communication module 304 may be configured to transmit data between modules, engines, databases, memories, and other components of the computing device 104 for use in performing the functions discussed herein. The communication module 304 may be comprised of one or more communication types and utilize various communication methods for communications within a computing device. For example, the communication module 304 may be comprised of a bus, contact pin connectors, wires, etc. In some embodiments, the communication module 304 may also be configured to communicate between internal components of the computing device 104 and external components of the computing device 104, such as externally connected databases, display devices, input devices, etc. The computing device 104 may also include a processing device. The processing device may be configured to perform the functions of the computing device 104 discussed herein as will be apparent to persons having skill in the relevant art.

In some embodiments, the processing device may include and/or be comprised of a plurality of engines and/or modules specially configured to perform one or more functions of the processing device, such as a querying module 308, verification module 310, hashing module 312, etc. As used herein, the term "module" may be software or hardware particularly programmed to receive an input, perform one or more processes using the input, and provide an output. The input, output, and processes performed by various modules will be apparent to one skilled in the art based upon the present disclosure.

The computing device 104 may also include a memory 306. The memory 306 may be configured to store data for use by the computing device 104 in performing the functions discussed herein. The memory 306 may be configured to store data using suitable data formatting methods and schema and may be any suitable type of memory, such as read-only memory, random access memory, etc. The memory 306 may include, for example, encryption keys and algorithms, communication protocols and standards, data formatting standards and protocols, program code for modules and application programs of the processing device, and other data that may be suitable for use by the computing device 104 in the performance of the functions disclosed herein as will be apparent to persons having skill in the relevant art. In some embodiments, the memory 306 may be comprised of or may otherwise include a relational database that utilizes structured query language for the storage, identification, modifying, updating, accessing, etc. of structured data sets stored therein.

The memory 306 may be configured to store a plurality of configuration rules. Each configuration rule may be used by the computing device 104 in the performing of functions associated therewith. For example, if the computing device 104 is a processing device associated with a payment network, a configuration rule may be associated with the routing of transaction messages, such as by indicating a financial institution for routing thereto based on an identification number stored in a data element included in the transaction message. In some instances, a configuration rule may include or otherwise be associated with a lock time or release time, which may indicate when the configuration rule takes or loses effect, respectively.

The computing device 104 may include a querying module 308. The querying module 308 may be configured to execute queries on databases to identify information. The querying module 308 may receive one or more data values or query strings, and may execute a query string based thereon on an indicated database, such as the memory 306, to identify information stored therein. The querying module 308 may then output the identified information to an appropriate engine or module of the computing device 104 as necessary. The querying module 308 may, for example, execute a query on the memory 306 to insert a new configuration rule or delete or modify an existing configuration rule based on a configuration transaction included in a newly added block included in the updated blockchain (e.g., received via the receiving device 302). The querying module 308 may be configured to insert, delete, or modify a configuration rule based on the value field included in the respective configuration transaction, which may be further based on a hash value included therein, if applicable.

The computing device 104 may also include a verification module 310. The verification module 310 may be configured to verify blocks included in the updated blockchain, and to verify configuration transactions included in a block. In some instances, the verification module 310 may generate data requests for transmission to the trusted entity 108 for verification, such as of a digital signature associated therewith. In other instances, the verification module 310 may receive data sets for verification, may verify the data sets based on data values included therein, and may output a result to another module or engine of the computing device 104. For example, the verification module 310 may receive a block header or a hash value or values included therein and the associated configuration transactions, and may verify that the hash value or values included in the block header correspond to the configuration transactions, such as by comparing the hash value or values to hash values of the configuration transactions, such as may be generated by the hashing module 312 of the computing device 104.

The hashing module 312 may be configured to generate hash values. The hashing module 312 may receive data to be hashed, may generate a hash value via the application of one or more hashing algorithms to the data, and may output the hash value to another module or engine of the computing device 104. In some instances, the hashing module 312 may receive an instruction indicating the hashing algorithm or algorithms to use to generate the hash value. In other instances, the hashing module 312 may identify (e.g., via the issuing of an instruction to the querying module 308) a hashing algorithm or algorithms to use to generate a hash value using provided data. The hashing module 312 may be configured to generate hash values of configuration transactions, and hash values of a plurality of hash values, such as generating a merkle root using hash values for a plurality of configuration transactions. The hashing module 312 may, for example, provide the generated hash value or values to the verification module 310 for verification.

The computing device 104 may also include a transmitting device 314. The transmitting device 314 may be configured to transmit data over one or more networks and communication channels via one or more network protocols and communication methods. In some instances, the transmitting device 314 may be configured to transmit data to other computing devices 104, the processing server 102, trusted entities 108, etc. In some embodiments, the transmitting device 314 may be comprised of multiple devices, such as different transmitting devices for transmitting data over different networks, such as a first transmitting device for transmitting data over Bluetooth and a second transmitting device for transmitting data via radio frequency. The transmitting device 314 may electronically transmit data signals that have data superimposed or otherwise encoded thereon that may be parsed by a receiving computing device. In some instances, the transmitting device 314 may include one or more modules for superimposing, encoding, or otherwise formatting data into data signals suitable for transmission.

The transmitting device 314 may be configured to electronically transmit data signals to other computing devices 104 that are superimposed or otherwise encoded with an updated blockchain for propagation of configuration data thereby. The transmitting device 314 may also be configured to electronically transmit data signals to a trusted entity 108 that are superimposed or otherwise encoded with a digital signature or other certificate for verification. The transmitting device 314 may also be configured to electronically transmit data signals to the processing server 102, which may be superimposed or otherwise encoded with data requests, such as a request for an updated blockchain or digital signature.

Process for Generation of an Updated Blockchain

Figure 4:
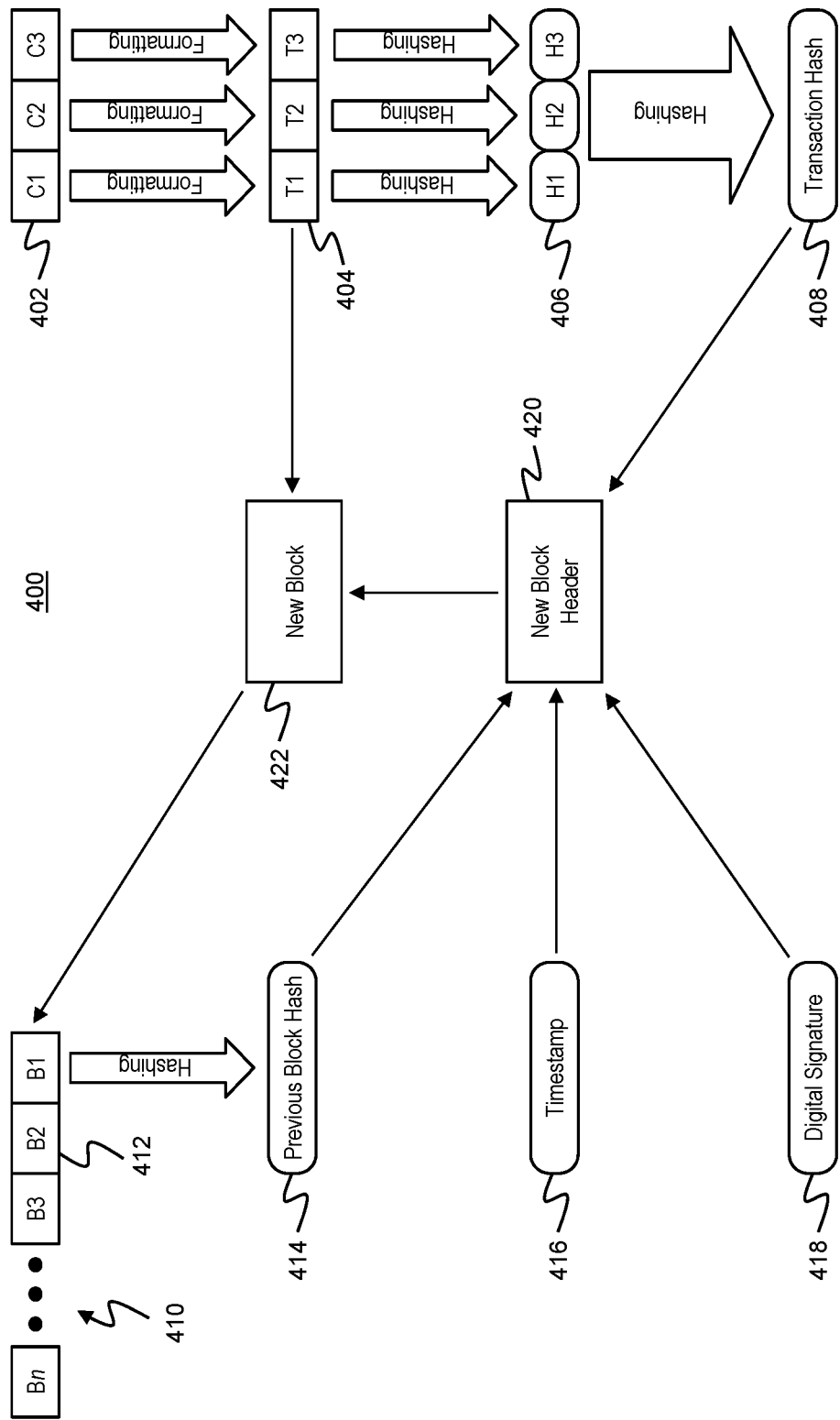
FIG. 4 is a flow diagram illustrating a process for the generation of a new block in a blockchain for propagation of configuration data in accordance with exemplary embodiments.

FIG. 4 illustrates a process 400 for the generation of a new block of configuration transactions for addition to the blockchain for propagation to the computing devices 104 by the processing server 102.

The receiving device 202 of the processing server 102 may receive a plurality of configuration data items 402 from the data provider 106, illustrated in FIG. 4 as the configuration data items C1, C2, and C3. Each configuration data item 402 may include configuration data and a value field, which may indicate if the configuration data is for a new configuration rule, for deletion of an existing configuration rule, or for modification of an existing configuration rule. A configuration data item 402 may also include a hash value, lock time, release time, or other data suitable for use in performing the functions discussed herein. The generation module 210 of the processing server 102 may be configured to format each of the configuration data items into a configuration transaction 404 for addition to the blockchain, illustrated in FIG. 4 as the resulting configuration transactions T1, T2, and T3.

The hashing module 212 of the processing server 102 may be configured to generate a hash value 406 for each of the configuration transactions 404 via the application of one or more hashing algorithms to the respective configuration transaction 404. The result may be a hash value 406 for each configuration transaction 404, illustrated in FIG. 4 as hash values H1, H2, and H3. The hashing module 212 may be configured to hash the combined hash values 406 via application of one or more hashing algorithms thereto to generate a transaction hash 408. The transaction hash 408 may be a single hash value, such as merkle root, of the hash values 406 for the configuration transactions 404.

The memory 206 of the processing server 102 may store a blockchain 410. The blockchain 410 may be comprised of a plurality of blocks 412, illustrated in FIG. 4 as blocks B1, B2, B3, through to Bn, representing a number n of blocks 412 in the blockchain 410. The hashing module 212 of the processing server 102 may be configured to generate a hash value of the most recent block 412 added to the blockchain 410, illustrated in FIG. 4 as block B1, such as may be identified via the timestamp included in the respective block header, by applying one or more hashing algorithms to the block 412. This may generate a previous block hash 414.

The generation module 210 of the processing server 102 may be configured to generate a new block header 420 for the block being added to the blockchain. The new block header 420 may include a timestamp 416 generated by the generation module 210, which may be a time representation of when the new block header 420 is generated or when the subsequent block is added to the existing blockchain 410. The new block header 420 may also include a digital signature 418, which may be issued or otherwise provided to the processing server 102 (e.g., received via the receiving device 202 of the processing server 102) by the trusted entity 108. The new block header 420 may also include the previous block hash 414 and transaction hash 408 generated by the hashing module 212.

The generation module 210 of the processing server 102 may then generate the new block 422 to be added to the existing blockchain 410. The new block 422 may be comprised of at least the new block header 420 and each of the configuration transactions 404 previously generated by the generation module 210. The new block 422 may then be appended to the existing blockchain 410, which may electronically transmitted by the transmitting device 214 of the processing server 102 to one or more computing devices 104 of the computing network for propagation thereto for the updating of configuration data.

Process for the Updating of Configuration Data

Figure 5:
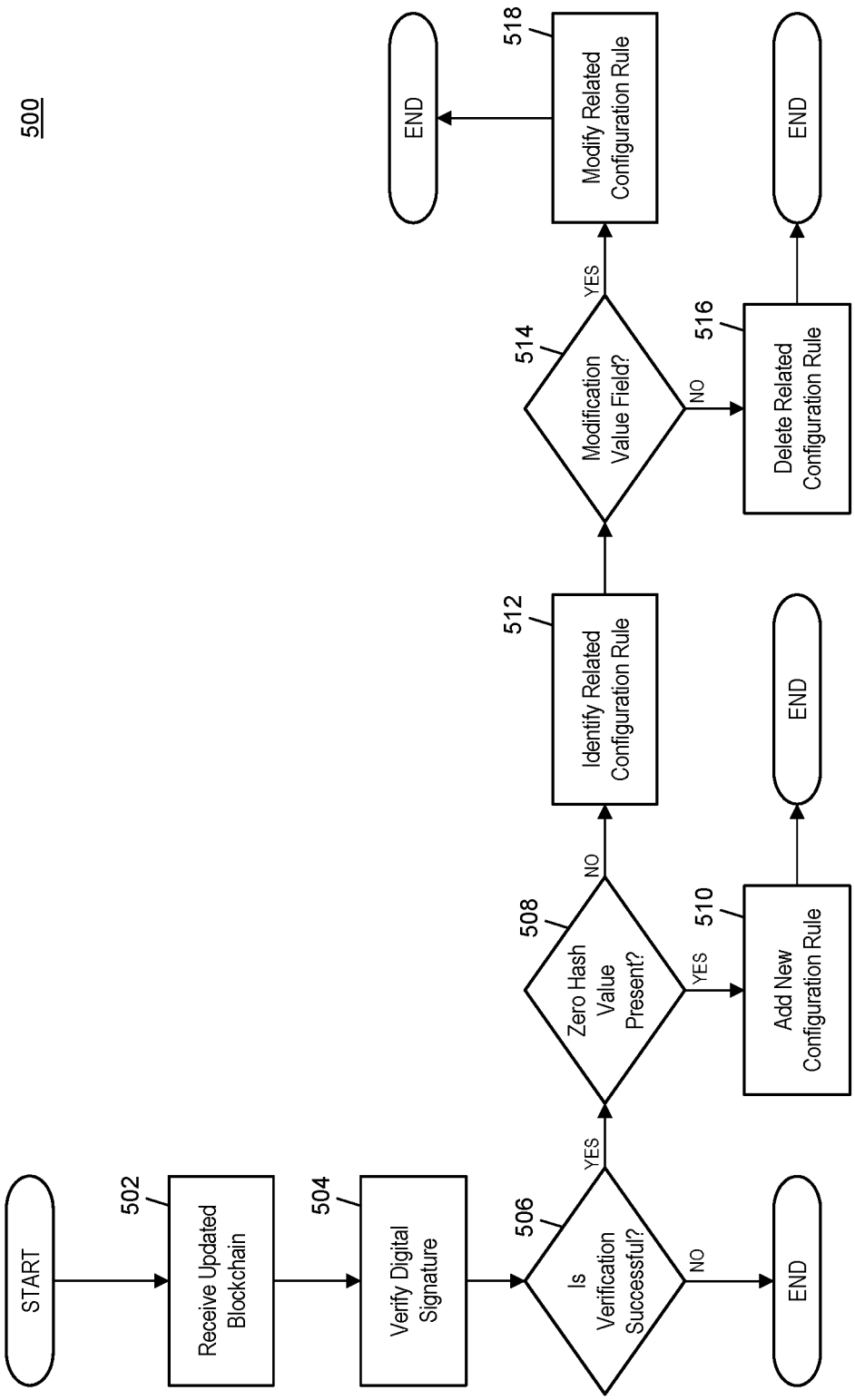
FIG. 5 is a flow diagram illustrating a process for the updating of configuration data in the computing device of FIG. 3 using a blockchain in accordance with exemplary embodiments.

FIG. 5 illustrates a process 500 for the updating of configuration rules in the computing devices 104 of the computing network based on configuration data propagated via blockchain using the processing server 102.

In step 502, the receiving device 302 of a computing device 104 may receive an updated blockchain from the processing server 102 or another computing device 104 using a suitable communication network and method. The updated blockchain, which may be generated by the processing server 102 using the process 400 illustrated in FIG. 4 and discussed above, may include a newly added block that may include a plurality of configuration transactions and a block header, the block header including a timestamp, prior block hash value, one or more transaction hash values, and a digital signature.

In step 504, the verification module 310 of the computing device 104 may verify the digital signature. In some embodiments, the verification module 310 may perform the verification itself using suitable methods for the verification of a digital signature or other digital certificate. In other embodiments, the verification module 310 may generate a data request to be electronically transmitted to the trusted entity 108 by the transmitting device 314 of the computing device 104 for verification of the digital signature. In step 506, the computing device 104 may determine if the verification was successful. The determination may be based on the result of the verification performed by the verification module 310, or as indicated in a data signal received by the receiving device 302 from the trusted entity 108. If the verification is not successful, then the process 500 may be completed as the computing device 104 may not update configuration rules for an unverified block of configuration transactions.

If the verification is successful, then the process may proceed to step 508, to be executed for every configuration transaction included in the newly added block of configuration transactions. In step 508, the computing device 104 may determine if a zero hash value is present in the configuration transaction. If a zero hash value is present, then it may indicate that no existing configuration rule is being modified or deleted. As such, the process 500 may proceed to step 510, where the querying module 308 of the computing device 104 may execute a query on the memory 306 of the computing device 104 to insert a new configuration rule therein that includes the configuration data included in the configuration transaction. In instances where the configuration transaction may include a lock time or release time, the querying module 308 may include the time or times in the configuration rule, or may update other data included in the memory 306 accordingly. For instance, the memory 306 may include a list of times and actions to be performed therewith, such as the starting or stopping of the activation of a configuration rule.

If, in step 508, the computing device 104 determines that a zero hash value is not present (e.g., the hash value in the configuration transaction is nonzero), then, in step 512, the querying module 308 of the computing device 104 may execute a query on the memory 306 to identify a configuration rule that corresponds to the hash value. The correspondence may be identified via equivalence of the hash value included in the configuration value to a hash value of the prior configuration transaction provided for addition of the respective configuration rule, such as may be generated via the hashing module 312 of the computing device 104.

In step 514, the computing device 104 may determine if the value field included in the configuration transaction indicates if the configuration rule is to be modified. If the value field does not indicate that the configuration rule is to be modified, then, in step 516, the querying module 308 may execute a query on the memory 306 to delete the configuration rule. If the value field indicates that the configuration rule is to be modified, then, in step 518, the querying module 308 may execute a query on the memory 306 to modify the identified configuration rule based on the configuration data included in the configuration transaction. In some instances, the configuration data may include a second hash value. In such instances, the identified configuration rule may be modified to revert back to configuration data included in a configuration transaction that corresponds to the second hash value (e.g., as identified via the hashing module 312 and querying module 308).

Exemplary Method for Propagating Configuration Data Using a Blockchain

Figure 6:
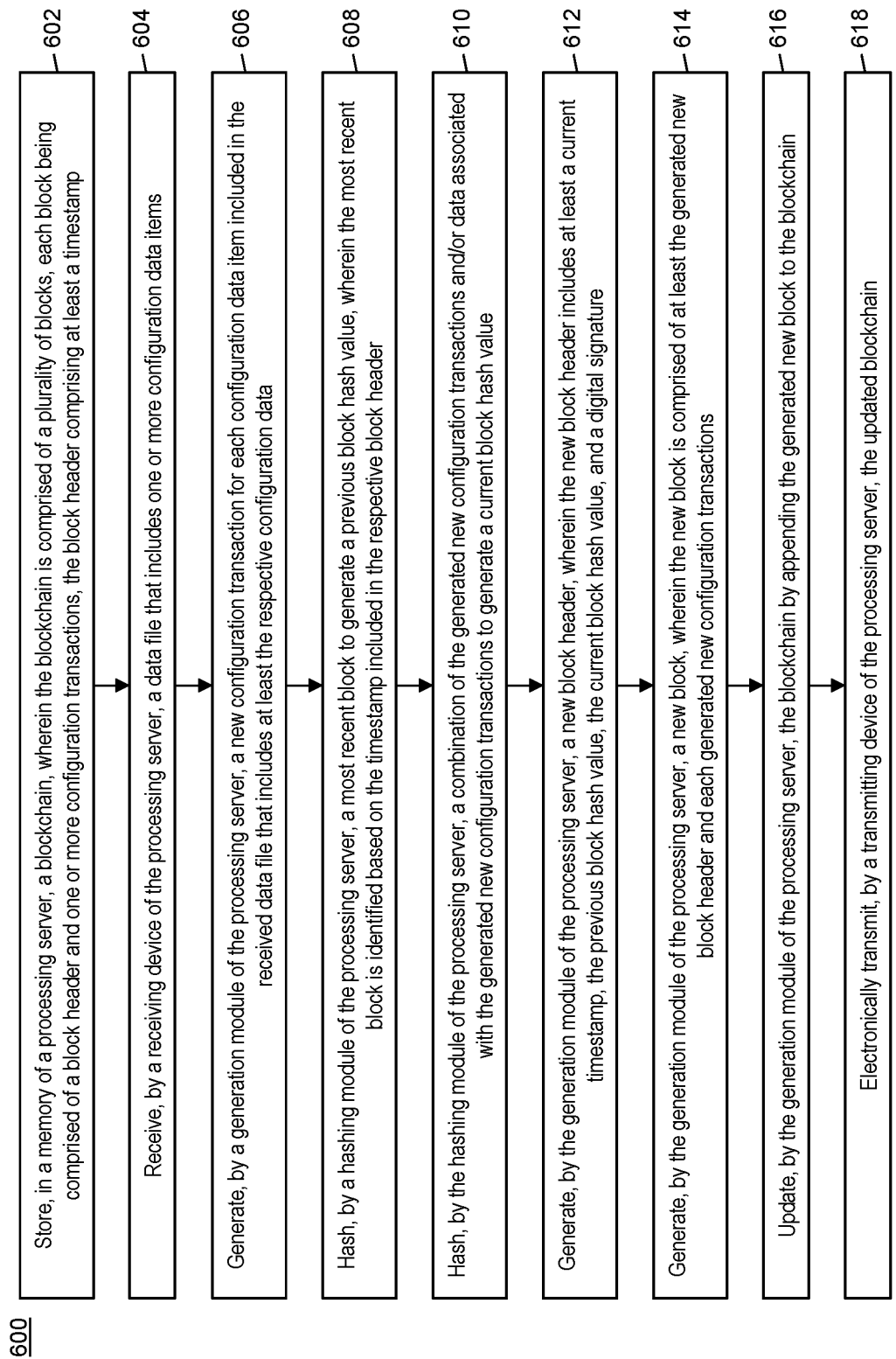
FIG. 6 is a flow chart illustrating an exemplary method for propagating configuration data using a blockchain in accordance with exemplary embodiments.

FIG. 6 illustrates a method 600 for the propagation of configuration data to computing devices in a computing network using transactions in a blockchain.

In step 602, a blockchain may be stored in a memory (e.g., the memory 206) of a processing server (e.g., the processing server 102), wherein the blockchain is comprised of a plurality of blocks, each block being comprised of a block header and one or more configuration transactions, the block header comprising at least a timestamp. In step 604, a data file may be received by a receiving device (e.g., the receiving device 202) of the processing server that includes one or more configuration data items.

In step 606, a new configuration transaction may be generated by a generation module (e.g., the generation module 210) of the processing server for each configuration data item included in the received data file that includes at least the respective configuration data. In step 608, a most recent block of the blockchain may be hashed by a hashing module (e.g., the hashing module 212) of the processing server to generate a previous block hash value, wherein the most recent block is identified based on the timestamp included in the respective block header.

In step 610, a combination of the generated new configuration transactions and/or data associated with the generated new configuration transactions may be hashed by the hashing module of the processing server to generate a current block hash value. In step 612, a new block header may be generated by the generation module of the processing server, wherein the new block header includes at least a current timestamp, the previous block hash value, the current block hash value, and a digital signature.

In step 614, a new block may be generated by the generation module of the processing server, wherein the new block is comprised of at least the generated new block header and each generated new configuration transaction. In step 616, the blockchain may be updated by the generation module of the processing server by appending the generated new block to the blockchain. In step 618, the updated blockchain may be electronically transmitted by a transmitting device (e.g., the transmitting device 214) of the processing server.

In one embodiment, the method 600 may further include hashing, by the hashing module of the processing server, each of the generated new configuration transactions to generate, for each new configuration transaction, an associated hash value, wherein the data associated with the generated new configuration transactions includes the hash value associated with each new configuration transaction. In some embodiments, the data file may further include a lock time and/or a release time associated with at least one of the one or more configuration data items, and the new configuration transaction generated for each of the at least one of the one or more configuration data items may further include the associated lock time and/or release time.

In one embodiment, the data file may further include a hash reference value associated with at least one of the one or more configuration data items, the new configuration transaction generated for each of the at least one of the one or more configuration data items may further include the associated hash reference value, and the hash reference value may correspond to a hash of a previous configuration transaction included in one of the plurality of blocks comprising the blockchain. In some embodiments, the digital signature may resolve to a trusted certificate entity (e.g., the trusted entity 108) associated with the blockchain.

Exemplary Method for Updating Configuration Data Using a Blockchain

Figure 7:
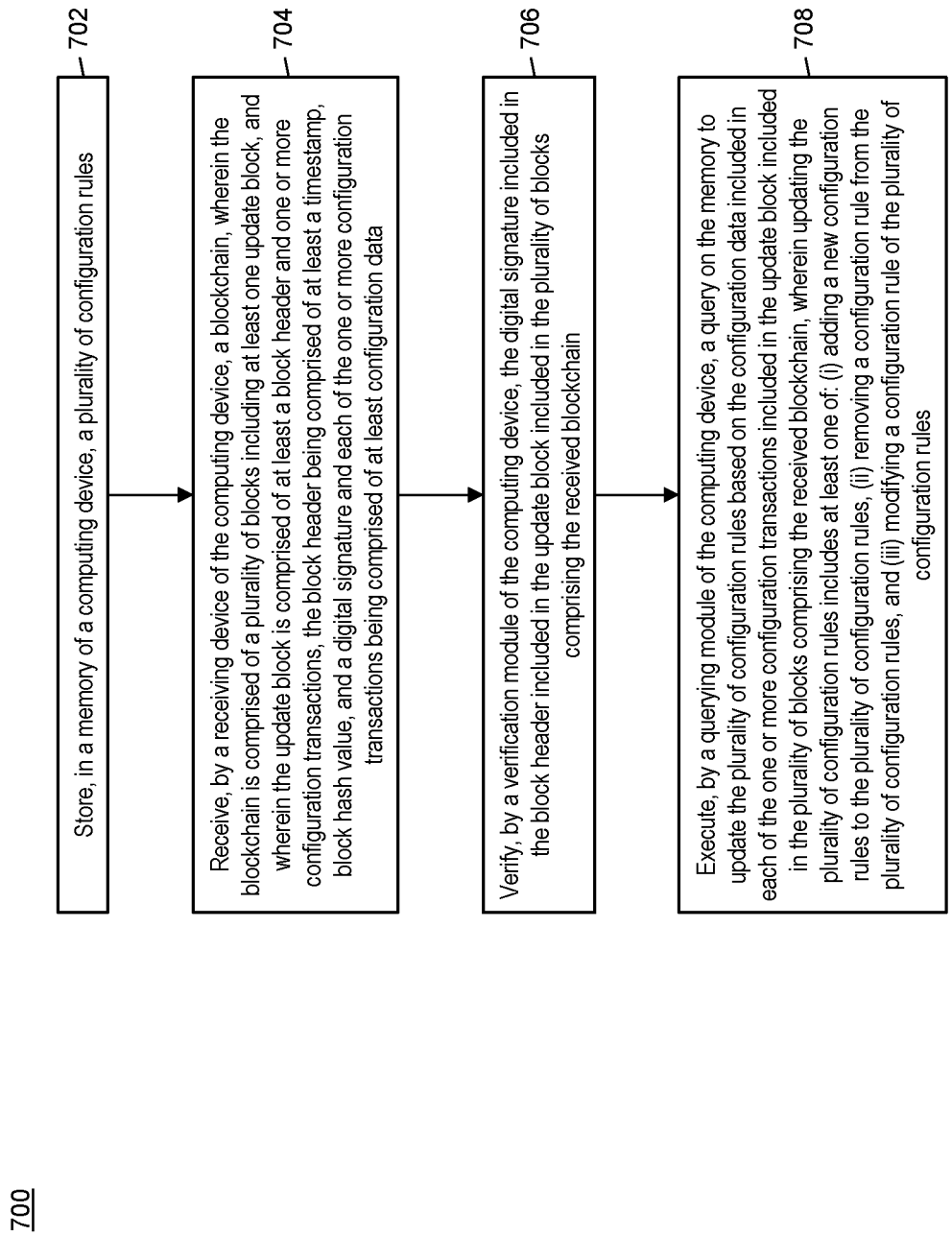
FIG. 7 is a flow chart illustrating an exemplary method for updating configuration data using a blockchain in accordance with exemplary embodiments.

FIG. 7 illustrates a method 700 for the updating of configuration rules in computing devices of a computing network based on configuration data propagated thereto using a blockchain.

In step 702, a plurality of configuration rules may be stored in a memory (e.g., the memory 306) of a computing device (e.g., the computing device 104). In step 704, a blockchain may be received by a receiving device (e.g., the receiving device 302) of the computing device, wherein the blockchain is comprised of a plurality of blocks including at least one update block, and wherein the update block is comprised of at least a block header and one or more configuration transactions, the block header being comprised of at least a timestamp, block hash value, and a digital signature and each of the one or more configuration transactions being comprised of at least configuration data.

In step 706, the digital signature included in the block header included in the update block included in the plurality of blocks comprising the received blockchain may be verified by a verification module (e.g., the verification module 310) of the computing device. In step 708, a query may be executed on the memory of the computing device by a querying module (e.g., the querying module 308) of the computing device to update the plurality of configuration rules based on the configuration data included in each of the one or more configuration transactions included in the update block included in the plurality of blocks comprising the received blockchain, wherein updating the plurality of configuration rules includes at least one of: (i) adding a new configuration rules to the plurality of configuration rules, (ii) removing a configuration rule from the plurality of configuration rules, and (iii) modifying a configuration rule of the plurality of configuration rules.

In one embodiment, each of the one or more configuration transactions included in the update block included in the plurality of blocks comprising the received blockchain may further include at least a value field and a hash value, and updating the plurality of configuration rules based on the configuration data included in a configuration transaction may include (i) adding a new configuration rule corresponding to the configuration data if the hash value is a zero hash reference or other predetermined hash value, (ii) removing a configuration rule associated with the hash value if the value field is a first predetermined value, and (iii) modifying a configuration rule associated with the hash value if the value field is a second predetermined value, the modification corresponding to the configuration data. In a further embodiment, the hash value may correspond to a hash of a previous configuration transaction included in one of the plurality of blocks comprising the blockchain.

In some embodiments, at least one of the one or more configuration transactions included in the update block included in the plurality of blocks comprising the received blockchain may further include a lock time or release time, and one or more configuration rules of the plurality of configuration rules updated based on the configuration data included in the at least one of the one or more configuration transactions that includes a lock time or release time may be configured to take effect at the lock time or stop effect at the release time. In one embodiment, verifying the digital signature may include: electronically transmitting, by a transmitting device (e.g., the transmitting device 314) of the computing device, the digital signature or data associated with the digital signature to a trusted certificate entity (e.g., the trusted entity 108) associated with the blockchain; and receiving, by the receiving device of the computing device, an indication of positive verification from the trusted certificate entity.

Computer System Architecture

Figure 8:
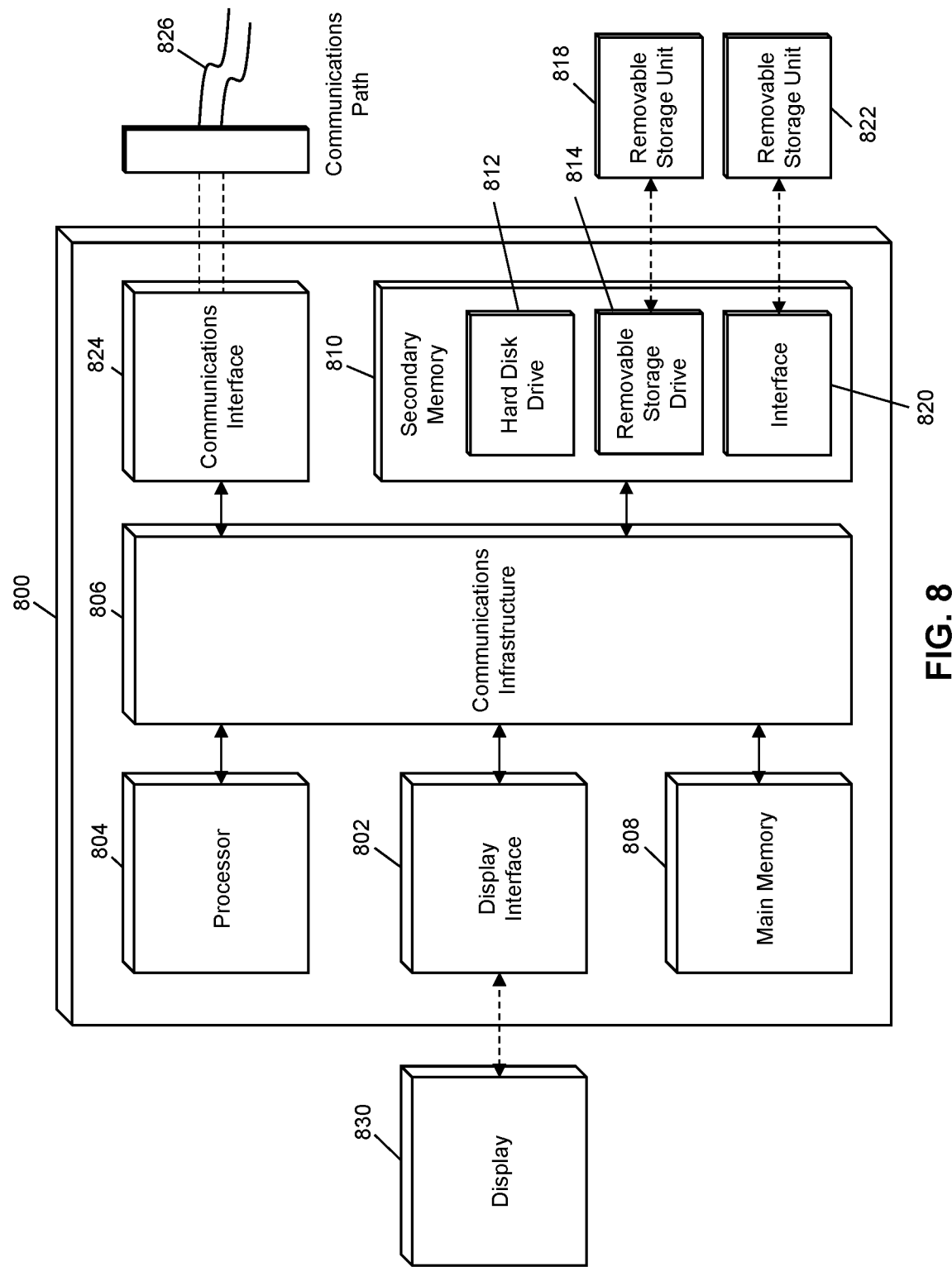
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the processing server 102 and computing devices 104 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4-7.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 4-7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for propagating and updating configuration data using a blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for updating configuration data using a blockchain, comprising:
   storing, in a memory of a computing device, a plurality of configuration rules;
   receiving, by a receiving device of the computing device, a blockchain, wherein the blockchain is comprised of a plurality of blocks including at least one update block, and wherein the update block is comprised of at least a block header and one or more configuration transactions, the block header being comprised of at least a timestamp, block hash value, and a digital signature and each of the one or more configuration transactions being comprised of at least configuration data;
   verifying, by a verification module of the computing device, the digital signature included in the block header included in the update block included in the plurality of blocks comprising the received blockchain; and
   executing, by a querying module of the computing device, a query on the memory to update the plurality of configuration rules based on the configuration data included in each of the one or more configuration transactions included in the update block included in the plurality of blocks comprising the received blockchain, wherein updating the plurality of configuration rules includes at least one of: (i) adding new configuration rules to the plurality of configuration rules and (ii) removing a configuration rule from the plurality of configuration rules.

2. The method of claim 1, further comprising:
   each of the one or more configuration transactions included in the update block included in the plurality of blocks comprising the received blockchain further includes at least a value field and a hash value; and
   updating the plurality of configuration rules based on the configuration data included in a configuration transaction includes (i) adding a new configuration rule corresponding to the configuration data if the hash value is a zero hash reference or other predetermined hash value and (ii) removing a configuration rule associated with the hash value if the value field is a first predetermined value.

3. The method of claim 2, wherein the hash value corresponds to a hash of a previous configuration transaction included in one of the plurality of blocks comprising the blockchain.

4. The method of claim 1, wherein
   at least one of the one or more configuration transactions included in the update block included in the plurality of blocks comprising the received blockchain further includes a lock time or release time, and
   one or more configuration rules of the plurality of configuration rules updated based on the configuration data included in the at least one of the one or more configuration transactions that includes a lock time or release time are configured to take effect at the lock time or stop effect at the release time.

5. The method of claim 1, wherein verifying the digital signature includes:
   electronically transmitting, by a transmitting device of the computing device, the digital signature or data associated with the digital signature to a trusted certificate entity associated with the blockchain; and receiving, by the receiving device of the computing device, an indication of positive verification from the trusted certificate entity.

6. A system for updating configuration data using a blockchain, comprising:
a memory of a computing device configured to store a plurality of configuration rules;
a receiving device of the computing device configured to receive a blockchain, wherein the blockchain is comprised of a plurality of blocks including at least one update block, and wherein the update block is comprised of at least a block header and one or more configuration transactions, the block header being comprised of at least a timestamp, block hash value, and a digital signature and each of the one or more configuration transactions being comprised of at least configuration data;
a verification module of the computing device configured to verify the digital signature included in the block header included in the update block included in the plurality of blocks comprising the received blockchain; and
a querying module of the computing device configured to execute a query on the memory to update the plurality of configuration rules based on the configuration data included in each of the one or more configuration transactions included in the update block included in the plurality of blocks comprising the received blockchain, wherein updating the plurality of configuration rules includes at least one of: (i) adding a new configuration rules to the plurality of configuration rules and (ii) removing a configuration rule from the plurality of configuration rules.

7. The system of claim 6, wherein
each of the one or more configuration transactions included in the update block included in the plurality of blocks comprising the received blockchain further includes at least a value field and a hash value, and
updating the plurality of configuration rules based on the configuration data included in a configuration transaction includes (i) adding a new configuration rule corresponding to the configuration data if the hash value is a zero hash reference or other predetermined hash value and (ii) removing a configuration rule associated with the hash value if the value field is a first predetermined value.

8. The system of claim 7, wherein the hash value corresponds to a hash of a previous configuration transaction included in one of the plurality of blocks comprising the blockchain.

9. The system of claim 6, wherein
at least one of the one or more configuration transactions included in the update block included in the plurality of blocks comprising the received blockchain further includes a lock time or release time, and
one or more configuration rules of the plurality of configuration rules updated based on the configuration data included in the at least one of the one or more configuration transactions that includes a lock time or release time are configured to take effect at the lock time or stop effect at the release time.

10. The system of claim 6, wherein verifying the digital signature includes:
electronically transmitting, by a transmitting device of the computing device, the digital signature or data associated with the digital signature to a trusted certificate entity associated with the blockchain; and receiving, by the receiving device of the computing device, an indication of positive verification from the trusted certificate entity.

11. A method for updating configuration data using a blockchain, comprising:
storing, in a memory of a computing device, a plurality of configuration rules;
receiving, by a receiving device of the computing device, a blockchain, wherein the blockchain is comprised of a plurality of blocks including at least one update block, and wherein the update block is comprised of at least a block header and one or more configuration transactions, the block header being comprised of at least a timestamp, block hash value, and a digital signature and each of the one or more configuration transactions being comprised of at least configuration data;
verifying, by a verification module of the computing device, the digital signature included in the block header included in the update block included in the plurality of blocks comprising the received blockchain; and
executing, by a querying module of the computing device, a query on the memory to update the plurality of configuration rules based on the configuration data included in each of the one or more configuration transactions included in the update block included in the plurality of blocks comprising the received blockchain, wherein updating the plurality of configuration rules includes at least one of: (i) adding new configuration rules to the plurality of configuration rules and (ii) modifying a configuration rule of the plurality of configuration rules.

12. The method of claim 11, wherein:
each of the one or more configuration transactions included in the update block included in the plurality of blocks comprising the received blockchain further includes at least a value field and a hash value; and
further comprising:
updating the plurality of configuration rules based on the configuration data included in a configuration transaction includes (i) adding a new configuration rule corresponding to the configuration data if the hash value is a zero hash reference or other predetermined hash value and (ii) modifying a configuration rule associated with the hash value if the value field is a second predetermined value, the modification corresponding to the configuration data.

13. The method of claim 12, wherein the hash value corresponds to a hash of a previous configuration transaction included in one of the plurality of blocks comprising the blockchain.

14. The method of claim 11, wherein
at least one of the one or more configuration transactions included in the update block included in the plurality of blocks comprising the received blockchain further includes a lock time or release time, and
one or more configuration rules of the plurality of configuration rules updated based on the configuration data included in the at least one of the one or more configuration transactions that includes a lock time or release time are configured to take effect at the lock time or stop effect at the release time.

15. The method of claim 11, wherein verifying the digital signature includes:
- electronically transmitting, by a transmitting device of the computing device, the digital signature or data associated with the digital signature to a trusted certificate entity associated with the blockchain; and
- receiving, by the receiving device of the computing device, an indication of positive verification from the trusted certificate entity.

16. A system for updating configuration data using a blockchain, comprising:
- a memory of a computing device configured to store a plurality of configuration rules;
- a receiving device of the computing device configured to receive a blockchain, wherein the blockchain is comprised of a plurality of blocks including at least one update block, and wherein the update block is comprised of at least a block header and one or more configuration transactions, the block header being comprised of at least a timestamp, block hash value, and a digital signature and each of the one or more configuration transactions being comprised of at least configuration data;
- a verification module of the computing device configured to verify the digital signature included in the block header included in the update block included in the plurality of blocks comprising the received blockchain; and
- a querying module of the computing device configured to execute a query on the memory to update the plurality of configuration rules based on the configuration data included in each of the one or more configuration transactions included in the update block included in the plurality of blocks comprising the received blockchain, wherein updating the plurality of configuration rules includes at least one of: (i) adding a new configuration rules to the plurality of configuration rules and (ii) modifying a configuration rule of the plurality of configuration rules.

17. The system of claim 16, wherein
- each of the one or more configuration transactions included in the update block included in the plurality of blocks comprising the received blockchain further includes at least a value field and a hash value, and
- updating the plurality of configuration rules based on the configuration data included in a configuration transaction includes (i) adding a new configuration rule corresponding to the configuration data if the hash value is a zero hash reference or other predetermined hash value and (ii) modifying a configuration rule associated with the hash value if the value field is a second predetermined value, the modification corresponding to the configuration data.

18. The system of claim 17, wherein the hash value corresponds to a hash of a previous configuration transaction included in one of the plurality of blocks comprising the blockchain.

19. The system of claim 16, wherein
- at least one of the one or more configuration transactions included in the update block included in the plurality of blocks comprising the received blockchain further includes a lock time or release time, and
- one or more configuration rules of the plurality of configuration rules updated based on the configuration data included in the at least one of the one or more configuration transactions that includes a lock time or release time are configured to take effect at the lock time or stop effect at the release time.

20. The system of claim 16, wherein verifying the digital signature includes:
- electronically transmitting, by a transmitting device of the computing device, the digital signature or data associated with the digital signature to a trusted certificate entity associated with the blockchain; and
- receiving, by the receiving device of the computing device, an indication of positive verification from the trusted certificate entity.

\* \* \* \* \*